US006871502B2

(12) United States Patent
Marin et al.

(10) Patent No.: US 6,871,502 B2
(45) Date of Patent: Mar. 29, 2005

(54) OPTIMIZED POWER GENERATION SYSTEM COMPRISING AN OXYGEN-FIRED COMBUSTOR INTEGRATED WITH AN AIR SEPARATION UNIT

(75) Inventors: Ovidiu Marin, Lisle, IL (US); Scott Macadam, Chicago, IL (US); Pietro Di Zanno, Rueil Malmaison (FR)

(73) Assignee: America Air Liquide, Inc., Houston, TX (US)

( * ) Notice: Subject to any disclaimer, the term of this patent is extended or adjusted under 35 U.S.C. 154(b) by 0 days.

(21) Appl. No.: 10/352,171

(22) Filed: Jan. 28, 2003

(65) Prior Publication Data

US 2003/0233830 A1 Dec. 25, 2003

Related U.S. Application Data

(60) Provisional application No. 60/357,379, filed on Feb. 15, 2002.

(51) Int. Cl.[7] .............................. F02C 3/30; F02C 6/18
(52) U.S. Cl. ...................... 60/772; 60/39.182; 60/39.53
(58) Field of Search .......................... 60/39.12, 39.182, 60/39.53, 772, 775

(56) References Cited

U.S. PATENT DOCUMENTS

| | | | |
|---|---|---|---|
| 4,434,613 A | | 3/1984 | Stahl |
| 4,651,519 A | * | 3/1987 | Goebel et al. ............. 60/39.12 |
| 5,956,937 A | | 9/1999 | Beichel |
| 6,148,602 A | | 11/2000 | Demetri |
| 6,202,442 B1 | | 3/2001 | Brugerolle |
| 6,247,315 B1 | | 6/2001 | Marin et al. |
| 6,256,994 B1 | * | 7/2001 | Dillon ........................ 60/649 |
| 6,272,171 B1 | | 8/2001 | Okunev et al. |
| 6,282,901 B1 | | 9/2001 | Marin et al. |

FOREIGN PATENT DOCUMENTS

| | | |
|---|---|---|
| DE | 3924908 A | 1/1991 |
| WO | WO 9744574 A | 11/1997 |

OTHER PUBLICATIONS

Bolland, et al.: Energy Conversion & Mgmt, V.33, No 5–8, 1992, p. 467.
E.I. Yantovskii : Proceedings of World Clean Energy Conference, Geneva Switzerland, 1991, pp. 571–595.
PCT International Search Report.

* cited by examiner

*Primary Examiner*—Louis J. Casaregola
(74) *Attorney, Agent, or Firm*—Linda K. Russell; Christopher J. Cronin

(57) ABSTRACT

A novel power generation system, more specifically an integrated power generation and air separation system and an integrated power generation and air separation process is provided. A key component of the system and process is an oxygen-fired combustor designed for gas turbine operating pressures. The combustor produces a high-temperature gas stream that enters one or more heat exchangers to generate/heat steam, and then enters one or more turbines to generate power. The steam from the heat exchanger drives one or more steam turbines to generate power, and the discharged steam is admitted to the combustor. To maximize cycle efficiency, steam extraction and reheat is incorporated in the process. Additional power is generated from a high-pressure nitrogen stream produced by an air separation unit (ASU). This process has the potential to attain high cycle efficiencies with zero emissions, while utilizing existing or near-term steam turbines, and moderate-pressure combustion systems.

40 Claims, 2 Drawing Sheets

OPTIMIZED POWER GENERATION SYSTEM COMPRISING AN OXYGEN-FIRED COMBUSTOR INTEGRATED WITH AN AIR SEPARATION UNIT

CROSS-REFERENCE TO RELATED APPLICATION(S)

This application is related to and claims priority under 35 U.S.C. §119(e) of U.S. Provisional Application Ser. No. 60/357,379, filed Feb. 15, 2002, the entire contents of which are incorporated herein by reference.

STATEMENT REGARDING FEDERALLY SPONSORED RESEARCH OR DEVELOPMENT

This invention was made without government support.

BACKGROUND OF THE INVENTION

1. Field of the Invention

The present invention relates to an optimized power generation system and process. More specifically, the present invention relates to an integrated power generation system and process comprising an oxygen-fired combustor integrated with an air separation unit.

2. Brief Description of Art

The products of air separation units can be used in various power generation schemes and can enhance the performance of existing power generation systems. Such products may therefore play key roles in the high-efficiency, low or zero-emission power generation schemes of the future. For example, oxygen and oxygen-enriched air have been demonstrated to enhance combustion, increase production, and reduce emissions. Oxy-combustion also has the inherent advantage of producing a $CO_2$-rich flue gas, which can be more easily processed than flue gas from air-blown processes. With the increasing interest in global climate change, more attention will undoubtedly be focused on technologies that facilitate the capture of $CO_2$. The greater ease with which $CO_2$-rich flue gas produced by oxy-combustion may be processed to capture $CO_2$ therefore suggests that the further development of this technology would be beneficial.

Nitrogen product streams can also offer benefits to a power generation system. For instance, high-pressure nitrogen, available from the high-pressure column of a cryogenic air separation unit (ASU), when appropriately heated and expanded in an integrated power generation scheme, can further increase power output.

The integration of air separation units with power generation processes has been the topic of several patent applications and technical articles. For example, in U.S. Pat. No. 6,282,901 (Marin et al), an oxygen-enriched stream from an ASU is fed to a combustor. The combustor flue gases are used to raise steam and generate power in several distinct embodiments. A nitrogen-enriched stream from the ASU is also heated and expanded to generate additional power. High cycle efficiencies, with low or zero emissions, are possible with these highly integrated schemes. However, the specific concept described in the present invention is not discussed.

In commonly-assigned U.S. Provisional Patent Application No. [60/356,105], entitled "Integrated Air Separation Unit and Oxygen-fired Power Generation System", an integrated air separation and oxygen-fired power generation system is disclosed. The power generation system includes one or more oxygen-fired combustors that supply drive gas to the expander section of a gas turbine, as well as to other turbines in an optimized configuration. The turbines directly drive the compressor section of the gas turbine, which functions as the main ASU air compressor. With an optimized turbine configuration, and high level of heat integration, this scheme has the potential to reduce the power costs of the ASU below levels attained with an onsite power plant. The effluent from this process is a concentrated carbon dioxide stream that can be further purified and sold as a byproduct. Unlike the present invention, the disclosed system is a self-powered, multi-product gas generator i.e., the system produces oxygen, nitrogen, argon, and carbon dioxide, with fuel and air as the only inputs.

U.S. Pat. No. 6,148,602 (Demetri) describes a power generation system in which an oxygen-fired combustor produces drive gas for a turbine. The turbine drives an air compressor and an oxygen compressor on a single shaft. The air compressor supplies an ASU with an air feed stream, while the oxygen compressor supplies high pressure oxygen to the combustor. The combustor receives gaseous fuel from a solid fuel gasifier, and water is recycled to the combustor to control the outlet temperature. Downstream of the turbine, $CO_2$ is separated in a condenser, and delivered to a sequestration site. Additional energy is said to be possibly recovered from the ASU nitrogen stream, although no details are provided concerning how this would occur. Ideal operating parameters of the turbine are not specified.

Bolland et al (Energy Conversion & Mgmt, V. 33, No. 5–8, 1992, p. 467) proposed a scheme that consists of supplying a combustor with oxygen from an ASU, reacting the oxygen with a fuel, adding water or steam to control the combustor outlet temperature, and passing the combustor gases through a turbine to generate power. A water inlet stream is used in a heat recovery scheme to cool the discharge of the ASU main compressor. The scheme includes a power generation process that receives an oxygen inlet stream from an ASU. However, the degree of integration between the ASU and the power cycle is limited.

E. I. Yantovskii (Proceedings of World Clean Energy Conference, Geneva Switzerland, 1991, pp. 571–595) proposes a scheme that employs oxygen-fired combustion with water recycle. A high-pressure combustor receives oxygen from an ASU, hydrocarbon fuel, and recycled water and produces a steam/$CO_2$ drive gas that enters a turbine. This is followed by two stages of reheating and expansion. The $CO_2$ is separated in a condenser, and the condensate is recycled to the high-pressure combustor. In this scheme, the ASU is treated as a supplier of oxygen, and the ASU is not integrated with the power generation system.

In U.S. Pat. No. 5,956,937 (Beichel), a power generation system is described that utilizes an oxygen-fired gas generator and at least one oxygen-fired reheater to produce drive gas for a series of turbines. The key features of this system are depicted in FIG. 1. In this scheme, oxygen, a gaseous hydrocarbon fuel, and water/steam are supplied to a high-pressure combustor or gas generator. This device produces drive gas for a high-pressure turbine. The discharge from the high-pressure turbine is reheated in a second combustor fired with additional fuel and oxygen. The discharge enters one or more turbines to produce additional power. Since the drive gas is produced by contacting water/steam with the combustion products, it contains significant levels of carbon dioxide. In practice, the gas generator and reheater will be operated with excess oxygen to ensure complete combustion. As a result, the drive gas will also contain significant levels of residual oxygen.

Any increase in the operating pressure and temperature of the high-pressure turbine will raise the overall efficiency of this cycle. Current steam turbine temperature limitations are in the range of 1050–1100° F. (840–870K) and pressure limits are around 3500 psi (240 bar). Steam turbines, however, have been designed to operate with pure steam as the drive gas. Their performance in the presence of impurities, especially at higher pressures and temperatures, is questionable. Therefore, there is a level of risk involved in using the gas generator as a source of high-pressure drive gas.

In U.S. Pat. Nos. 6,202,442 and 6,272,171 (Brugerolle), an integrated power generation system is described in which part of the air from a gas turbine compressor is separated in a single nitrogen wash column to remove oxygen. Gaseous nitrogen produced at the top of the column is then sent back to a point upstream of the expander of the gas turbine.

In U.S. Pat. No. 6,247,315 (Marin et al), an improved combustion process for use in, e.g., a combined cycle co-generation installation is described.

Even though various processes and systems for the generation of power and the separation of air have been developed, as briefly noted above, a need continues to exist for the improvement of integrated systems for power generation and air separation.

OBJECTS AND SUMMARY OF THE INVENTION

It is an object of the present invention to provide a novel power generation system, more specifically an integrated power generation and air separation system and an integrated power generation and air separation process. A key component of the system and process is an oxygen-fired combustor designed for gas turbine operating pressures. The combustor produces a high-temperature gas stream that enters one or more heat exchangers to generate/heat steam, and then enters one or more turbines to generate power. The steam from the heat exchanger drives one or more steam turbines to generate power, and the discharged steam is admitted to the combustor. To maximize cycle efficiency, steam extraction and reheat is incorporated in the process. Additional power is generated from a high-pressure nitrogen stream produced by the air separation unit (ASU). This process has the potential to attain high cycle efficiencies with zero emissions, while utilizing existing or near-term steam turbines, and moderate-pressure combustion systems.

In one embodiment, the integrated power generation and air separation system comprises a power generation system comprising at least one oxygen-fired combustor designed for gas turbine operating pressures, at least one main heat exchanger which generates steam, and at least one high-pressure steam turbine for generating power, and means for sending an oxygen-enriched stream and fuel to the combustor(s), means for sending combustor gases from the combustor(s) to the main heat exchanger(s), means for sending steam generated by the main heat exchanger(s) to the steam turbine(s), and means for sending steam discharged from the high-pressure steam turbine(s) to the combustor(s); and, an air separation system comprising at least one air separation unit which comprises at least one device for separating air into oxygen-enriched and nitrogen-enriched streams, at least one nitrogen gas compressor, at least one heater for compressed nitrogen gas, and at least one nitrogen gas turbine for generating power, and means for sending nitrogen to the nitrogen gas compressor(s), means for sending compressed nitrogen from the compressor(s) to the heater(s), means for sending nitrogen gas from the heater(s) to the nitrogen gas turbine(s), and, optionally, means for sending the oxygen-enriched stream to the combustor(s).

In another embodiment, the integrated power generation and air separation process comprises introducing an oxygen-enriched stream and fuel into at least one combustor designed for gas turbine operating pressures, sending the discharge from the combustor(s) to at least one main heat exchanger which generates steam, generating steam in the main heat exchanger(s), sending the steam to at least one high-pressure steam turbine to generate power, and sending steam discharged from the turbine(s) to the combustor(s); and, introducing air into at least one air separation unit, separating the air into an oxygen-enriched stream and a nitrogen-enriched stream, feeding the nitrogen-enriched stream to at least one nitrogen gas compressor, heating the compressed nitrogen-enriched stream, passing the compressed nitrogen-enriched stream through at least one nitrogen gas turbine to generate power, and, optionally, feeding the oxygen-enriched stream to the combustor(s).

BRIEF DESCRIPTION OF THE FIGURES

The subject invention will be better understood by reference to the following drawings, in which.

DETAILED DESCRIPTION OF THE PREFERRED EMBODIMENTS OF THE INVENTION

Figure 1:
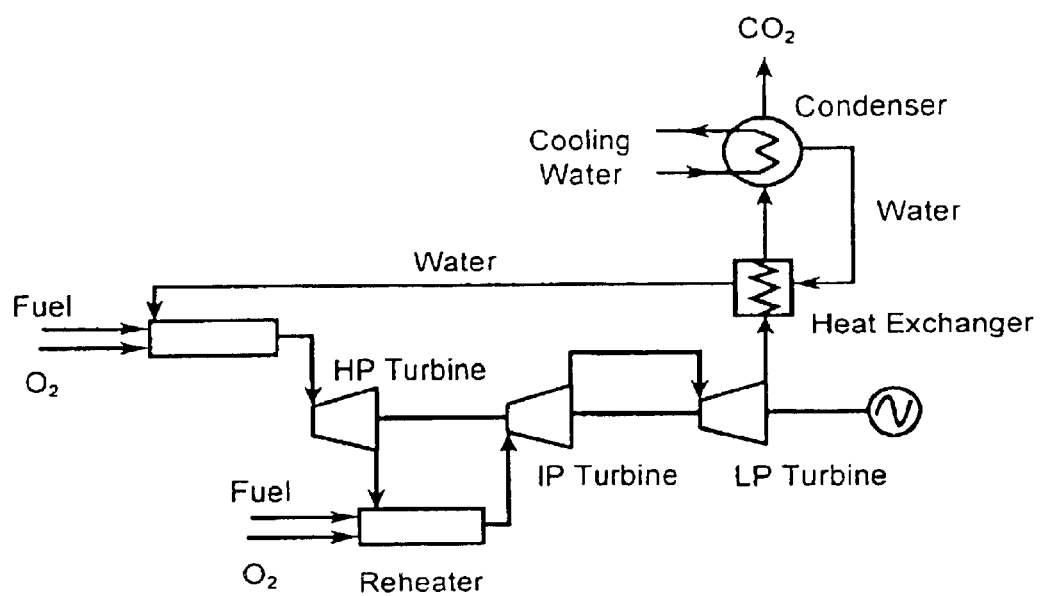
FIG. 1 is a schematic flow diagram of a prior art process according to U.S. Pat. No. 5,956,937 (Beichel), as noted above.

In accordance with the present invention, an optimized process and system is provided for providing power. In general, the power generation system and the air separation system are operably integrated. By "operably integrated" it is intended that the power generation system and the air separation system are linked at least to the extent that the some of process gases and/or liquids are used in common for both systems. For example, in one embodiment, the nitrogen discharge from the nitrogen gas turbine(s) of the air separation system may be supplied to the feedwater heat exchanger(s) to provide feedwater heating for the main heat exchanger(s). In turn, the main heat exchanger(s) generate steam to drive the gas turbines of the power generation system.

In a preferred embodiment, the integrated power generation and air separation system further comprises a feedwater heater system comprising at least one feedwater heater for the main heat exchanger(s). In general, the feedwater heater system comprises means for sending steam and combustion gases from the turbine(s) to the feedwater heater(s) to provide feedwater heating.

In an additional embodiment, the integrated power generation and air separation process and system may further comprise one or more intermediate-pressure turbines and/or one or more low-pressure turbines and means for sending combustion gases to the intermediate-pressure turbine(s) and/or low-pressure turbine(s). In this embodiment, the feedwater heater system may comprise means for sending steam from the high-pressure steam turbine(s), and combustion gases from the intermediate-, and/or low-pressure turbine(s) to the feedwater heater(s) to provide feedwater heating.

Alternatively, or in addition, the feedwater heater system may further comprise at least one feedwater heat exchanger and means for sending the nitrogen discharge from the nitrogen gas turbine(s) to the feedwater heat exchanger(s) to provide feedwater heating.

The process and system may also include sending steam from the high-pressure steam turbine(s), and/or combustion gases from the intermediate-, and/or low-pressure turbine(s) to the feedwater heater(s) using one or more extractions of steam and/or combustion gases from the turbine(s). These extractions may be used to provide feedwater heating and/or to reduce the flowrate of non-condensable gases through the turbine(s).

In addition, at least one reheater for the high-pressure steam, intermediate-, and/or low-pressure turbine(s), means for sending steam and/or combustion gases from the turbine(s) to the reheater(s) and means for returning heated steam and/or combustion gas discharge from the reheater(s) to the turbine(s) may be included as optional components of the process and system.

It is preferred that the air separation unit(s) produce at least an oxygen-enriched stream and a nitrogen-enriched stream. The oxygen-enriched stream may then be supplied to the oxygen-fired combustor(s) and the nitrogen-enriched stream may be supplied to the nitrogen gas compressor(s). The nitrogen-enriched stream may further be heated in the main heat exchanger(s), or in a separately-fired heater or an oxygen-fuel combustor.

The steam produced by the main heat exchanger(s) is preferably high purity steam. By this it is meant that the steam contains no impurities, or very small amounts of impurities, preferably less than about 1% by weight, more preferably less than about 0.1% by weight.

Although not intended to be limited to a specific pressure range, the phrase "gas turbine operating pressures" generally refers to the normal operating pressures at which such gas turbines are operated. Such pressures typically are in the range of about 6 to about 30 bar (about 600 to about 3,000 kPa), preferably about 10 to about 25 bar (about 1,000 to about 2,500 kPa). By the phrase "combustor designed for gas turbine operating pressures", it is meant that the combustor is designed, and is generally intended, for operation at such gas turbine operating pressures.

As used herein, the terms "high-pressure", "intermediate-pressure" and "low-pressure", as used to describe the steam turbines, generally refer to certain ranges of pressure. For instance, "high-pressure" steam turbines typically operate in a pressure range of about 30 to about 240 bar (about 3,000 to about 24,000 kPa), "intermediate-pressure" turbines typically operate in a pressure range of about 6 to about 30 bar (about 600 to about 3,000 kPa), and "low-pressure" turbines typically operate in a pressure range of about 0.04 to about 1 bar (about 4 to about 100 kPa).

By "air separation unit" or "ASU", it is intended that any gas or liquid separating means and process of using the means for separating two or more gaseous and/or liquid components including, without limitation, a membrane system, cryogenic system, vacuum swing adsorption (VSA) system, pressure swing adsorption (PSA) system, temperature swing adsorption (TSA) system and combinations thereof. The ASU may be on-site or high-pressure $O_2$ and/or $N_2$ gas streams may be transported, for example, by pipeline from an ASU at a remote location.

By "$O_2/N_2$ source" we mean any mixture, whether in a gaseous state, liquid state or combination thereof, comprising at least $O_2$ and $N_2$, which may be separated into at least an $O_2$-enriched stream and $N_2$-enriched gas stream.

By "gas", we mean that the stream is primarily gaseous, but may have entrained solid particulates or liquid.

By "enriched", it is intended that the major component of the gaseous stream exceeds the average concentration of that same gaseous component in the earth's atmosphere. For example, as used herein, an "$O_2$-enriched gas stream" will have greater than about 21% by volume $O_2$ in the gas stream, a "$N_2$-enriched gas stream" will have greater than about 78% by volume $N_2$ in the gas stream. A single gas stream may be "enriched" with one or more gaseous components of interest.

In a preferred embodiment, the integrated power generation and air separation process further comprises heating feedwater to the main heat exchanger(s) in a feedwater heater system comprising at least one feedwater heater for the main heat exchanger(s). The process may further comprise sending combustion gases from the main heat exchanger(s) to one or more intermediate-pressure turbines and/or one or more low-pressure turbines to generate power.

In an additional preferred embodiment, the integrated power generation and air separation process may further comprise sending steam from one or more high-pressure steam turbine(s), and/or combustion gases from one or more intermediate-pressure turbines and/or one or more low-pressure turbines to the feedwater heater(s) to provide feedwater heating.

Alternatively, or in addition, the process may include heating the feedwater in at least one feedwater heat exchanger and sending the nitrogen discharge from the nitrogen gas turbine(s) to the feedwater heat exchanger(s) to provide feedwater heating.

The process may also include one or more extractions of steam from the high-pressure steam turbine(s), and/or combustion gases from the intermediate-, and/or low-pressure turbine(s). The extracted steam and/or combustion gases may be used to provide heating of the feedwater and/or to reduce the flowrate of non-condensable gases through the turbine(s).

One or more reheater(s) may further be employed in the process in which steam from the high-pressure steam turbine(s), and/or combustion gases from the intermediate-, and/or low-pressure turbine(s) is sent to at least one reheater. The steam and/or combustion gases may then be heated in the reheater(s) and the heated steam and/or combustion gas discharge from the reheater(s) returned to the turbine(s).

Figure 2:
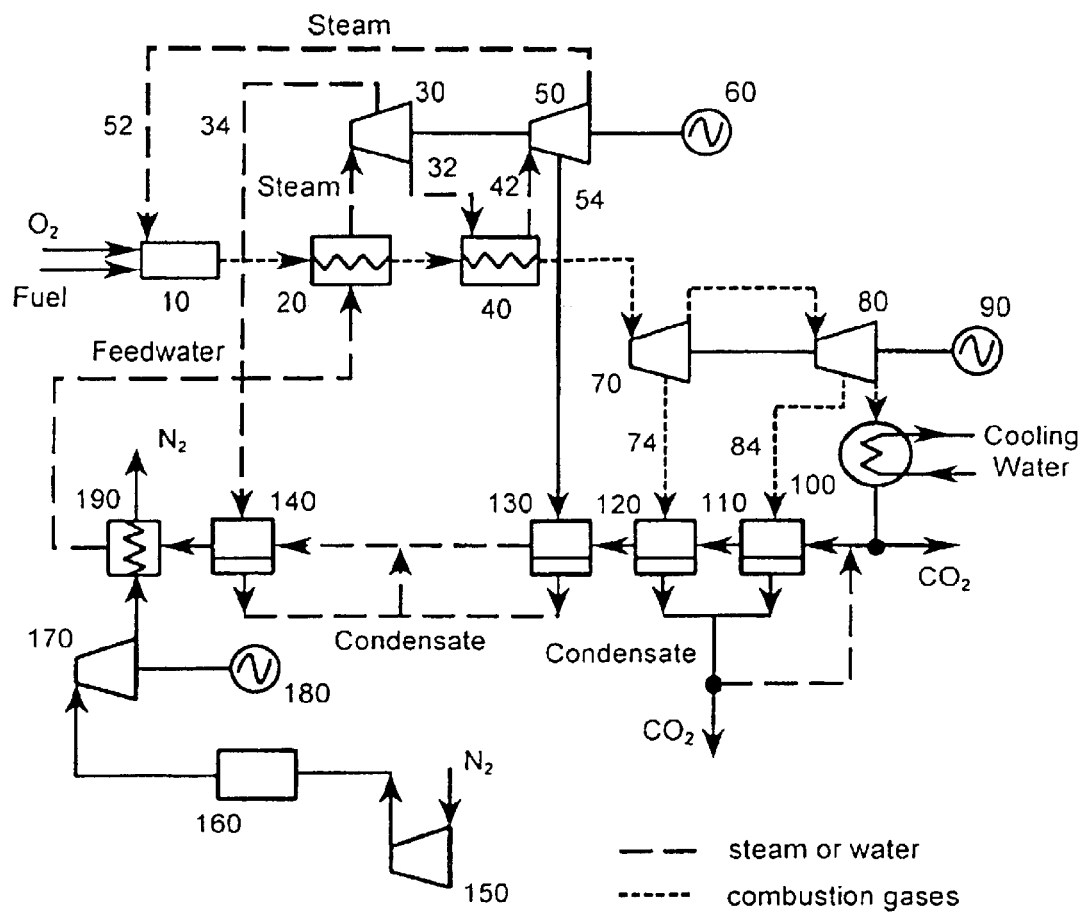
FIG. 2 is a schematic flow diagram of one embodiment of the present integrated power generation and air separation system.

In a preferred embodiment, an air separation unit may be integrated with a power generation cycle, e.g., as depicted in FIG. 2. In this scheme, gaseous fuel, an oxygen-enriched stream, and steam are delivered to a combustor 10. Generally, the combustor operates at pressures within the range of gas turbine combustors. The gas discharge from the combustor enters a heat exchanger 20, heating feedwater to produce high purity steam. The steam is fed to a high-pressure turbine 30. In this preferred embodiment, the turbine subsystem includes Rankine cycle optimization techniques, such as steam extraction (for regenerative feedwater heating) and steam reheat. This will maximize the efficiency of the cycle, using well established, proven techniques. As is shown in FIG. 2, the discharge 32 from the first steam turbine is heated by the combustor products in a reheater 40, and enters a second turbine 50 through steam inlet 42. Also, steam is withdrawn from both turbines by extractions at optimum locations. Although only one steam extraction from each turbine 34, 44 is shown in FIG. 2, additional extractions may be included from each turbine. The extractions are used to heat the feedwater stream by feedwater heaters 110, 120, 130, and 140, producing condensate, which is subsequently added to the feedwater. Power may be produced by a generator 60 driven by the turbines.

The discharge 52 from the second steam turbine 50 is used as an inlet stream to the combustor 10. The discharge 42 from the hot side of the reheater 40 enters one or more turbines to generate additional power. In the preferred embodiment depicted in FIG. 2, these turbines comprise an intermediate-pressure turbine 70, designed for gas turbine conditions, followed by a low-pressure turbine 80. These turbines also include extractions 74, 84 for regenerative feedwater heating, further increasing the efficiency of the process. Again, although only one extraction from each turbine is shown, additional extractions from one or more of the turbines may be included. This optimized scheme accounts for the fact that the working fluid in this section of the cycle contains levels of non-condensables ($CO_2$, $O_2$, etc.). Extraction of fluid at various locations in the cycle will reduce the flowrate of non-condensables through the discharge of the low pressure turbine. In turn, the vacuum pump power required to maintain the low-pressure turbine outlet pressure is reduced. Steam exiting the turbine 80 may be passed through a condenser 100 where the steam is condensed and passed to the feedwater heaters. Additional power may be produced by a generator 90 driven by the intermediate- and/or low-pressure turbines.

Oxygen for the combustor is preferably supplied by an on-site air separation unit (ASU) 200, which produces a stream of pressurized nitrogen. As shown in FIG. 2, this high-pressure nitrogen stream is compressed in compressor 150 to an optimal pressure, heated in heater 160, and expanded through an $N_2$ turbine 170 to produce supplemental power by generator 180. The nitrogen stream may be heated in the main heat exchanger, in a separately fired heater, or by direct firing in an oxy-fuel combustor. Heat is recovered from the nitrogen discharge by heat exchange with the feedwater stream in heat exchanger 190. The feedwater stream is admitted to the main heat exchanger 20 (or boiler) to generate high purity steam.

In accordance with the embodiments described herein, high cycle efficiencies are attained by a high level of heat recovery, integration with the ASU, implementation of steam extraction and reheat, and optimal choice of pressures and temperatures. In addition, the carbon dioxide effluent may be sold or delivered to a sequestration site, making the system a potentially zero-emissions process.

The integrated system and process of the invention may be differentiated from other power generation schemes in part by the use of high purity steam generated in a heat exchanger as the drive gas for the high-pressure turbines. In addition, the high-pressure steam cycle and the intermediate/low pressure cycles include efficiency optimizations, such as steam extraction for regenerative feedwater heating, and steam reheat. A high-pressure combustor is also not required. Instead, a moderate-pressure combustor capable of operating at gas turbine pressures may be used.

This integrated system and process of the invention also provides several benefits over other power generation schemes. For instance, the drive gas for the high-pressure turbine is high purity steam, rather than steam containing high levels of oxygen, carbon dioxide etc. This will reduce the risk of using commercially available steam turbines in the scheme, particularly at higher pressures and temperatures. In addition, implementation of optimization techniques, such as reheating and steam extraction, will increase the overall efficiency of the process. This cycle attains a very high efficiency, as it optimizes both the pure steam, as well as the flue gas cycle. As mentioned before, the system also does not require a high-pressure combustor, which is challenging to operate, fabricate, and poses certain safety risks. Less power is also required to compress the oxygen and fuel input streams to the combustor since it operates at more moderate gas turbine operating pressures.

While the present invention has been described in detail according to preferred embodiments, it is understood that various modifications, substitutions, omissions and changes may be made, and equivalents employed, without departing from the spirit of the invention or the scope of the appended claims.

What is claimed is:

1. An integrated power generation and air separation system comprising:
   (a) a power generation system comprising at least one oxygen-fired combustor designed for gas turbine operating pressures; at least one main heat exchanger which generates steam; one or more steam turbine(s), including at least one high-pressure steam turbine, for generating power; means for sending oxygen and fuel to the combustor(s); means for sending combustion gases from the combustor(s) to the main heat exchanger(s); means for sending steam generated by the main heat exchanger(s) to the turbine(s); and means for sending steam discharged from at least one steam turbine to the combustor(s);
   (b) an air separation system comprising at least one air separation unit which comprises at least one device for separating air into oxygen-enriched and nitrogen-enriched streams, at least one nitrogen gas compressor, at least one heater for compressed nitrogen gas, at least one nitrogen gas turbine for generating power; means for sending nitrogen to the nitrogen gas compressor(s); means for sending compressed nitrogen from the compressor(s) to the heater(s); means for sending nitrogen gas from the heater(s) to the nitrogen gas turbine(s);
   (c) a combustion gas power system comprising at least one intermediate-pressure turbine for generating power from the heated combustion gases; means for sending combustion gases from the main heat exchanger(s) to said turbine(s), means for extracting combustion gases from at least one turbine;
   (d) a feedwater regeneration system comprising at least one feedwater heater for the main heat exchanger(s) and at least one feedwater heater capable of receiving combustion gases extracted from the turbine(s) and of removing non-condensable gases from the turbine(s); and means for sending steam from the high-pressure steam turbine(s) to the feedwater heater(s) to provide feedwater heating.

2. A system as claimed in claim 1, further comprising one or more low-pressure turbines and means for sending combustion gases from the intermediate-pressure turbine(s) to the low-pressure turbine(s).

3. A system as claimed in claim 1, further comprising means for sending steam from the high-pressure steam turbine(s), to the feedwater heater(s) to provide feedwater heating.

4. A system as claimed in claim 1, wherein said feedwater regeneration system further comprises at least one feedwater heat exchanger and means for sending the nitrogen discharge from the nitrogen gas turbine(s) to the feedwater heat exchanger(s) to provide feedwater heating.

5. A system as claimed in claim 1, wherein said feedwater regeneration system further comprises at least one feedwater heat exchanger and means for sending the nitrogen discharge from the nitrogen gas turbine(s) to the feedwater heat exchanger(s) to provide feedwater heating.

6. A system as claimed in claim 1, wherein said means for sending steam from the high-pressure steam turbine(s) to the feedwater heater(s) comprises one or more extractions of steam from the turbine(s) to reduce the flowrate of non-condensable gases through the turbine(s).

7. A system as claimed in claim 3, wherein said means for sending steam from the high-pressure steam turbine(s), to the feedwater heater(s) comprises one or more extractions of steam from the turbine(s) to reduce the flowrate of non-condensable gases through the turbine(s).

8. A system as claimed in claim 1, further comprising at least one reheater for the high-pressure steam turbine(s), means for sending steam from the turbine(s) to the reheater(s) and means for returning heated steam discharge from the reheater(s) to the turbine(s).

9. A system as claimed in claim 1, further comprising at least one reheater for heating exhaust from the high-pressure steam turbine(s), means for sending steam from the high-pressure steam turbine(s) to the reheater(s) and means for returning heated discharge from the reheater(s) to feed further steam turbine(s).

10. A system as claimed in claim 1, wherein the air separation unit(s) produce an oxygen-enriched stream and a nitrogen-enriched stream.

11. A system as claimed in claim 10, wherein said oxygen-enriched stream from at least one air separation unit is supplied to the oxygen-fired combustor(s).

12. A system as claimed in claim 10, wherein said nitrogen-enriched stream from at least one air separation unit(s) is supplied to the nitrogen gas compressor(s).

13. A system as claimed in claim 12, wherein said nitrogen-enriched stream is heated in said main heat exchanger(s.

14. A system as claimed in claim 1, wherein the steam produced by the main heat exchanger(s) is high purity steam.

15. An integrated power generation and air separation process, comprising:
(a) introducing an oxygen-enriched stream and fuel into at least one combustor designed for gas turbine operating pressures;
(b) sending the discharge from the combustor(s) to at least one main heat exchanger which generates steam;
(c) generating steam in the main heat exchanger(s);
(d) sending the steam to one or more steam turbine(s), including at least one high-pressure steam turbine, to generate power;
(e) sending steam discharged from at least one steam turbine to the combustor(s);
(f) introducing air into at least one air separation unit,
(g) separating the air into an oxygen-enriched stream and a nitrogen-enriched stream;
(h) feeding the nitrogen-enriched stream to at least one nitrogen gas compressor;
(i) heating the compressed nitrogen-enriched stream;
(j) passing the compressed nitrogen-enriched stream through at least one nitrogen gas turbine to generate power;
(k) sending heated combustion gases discharged from one or more main heat exchanger(s) to at least one intermediate-pressure turbine to generate power;
(l) extracting combustion gases from at least one turbine;
(m) heating feedwater to said main heat exchanger(s) in a feedwater regeneration system comprising at least one feedwater heater for the main heat exchanger(s) and at least one feedwater heater capable of receiving combustion gases extracted from the turbine(s) and of removing non-condensable gases from the turbine(s);
(n) sending steam from the high-pressure steam turbine(s) to the feedwater heater(s) to provide feedwater heating.

16. A process as claimed in claim 15, further comprising sending combustion gases from the intermediate-pressure turbines to one or more low-pressure turbines to generate power.

17. A process as claimed in claim 16, further comprising heating feedwater to said main heat exchanger(s) in at least one feedwater heater using combustion gas as a heat source.

18. A process as claimed in claim 17, further comprising sending steam from the high-pressure steam turbine(s), to the feedwater heater(s) to provide feedwater heating.

19. A process as claimed in claim 15, further comprising heating said feedwater in at least one feedwater heat exchanger and sending the nitrogen discharge from the nitrogen gas turbine(s) to the feedwater heat exchanger(s) to provide feedwater heating.

20. A process as claimed in claim 17, further comprising heating said feedwater in at least one feedwater heat exchanger and sending the nitrogen discharge from the nitrogen gas turbine(s) to the feedwater heat exchanger(s) to provide feedwater heating.

21. A process as claimed in claim 15, wherein one or more extractions of steam from the high-pressure steam turbine(s) is employed to reduce the flowrate of non-condensable gases through the turbine(s).

22. A process as claimed in claim 18, wherein one or more extractions of steam from the high-pressure steam turbine(s) is employed to reduce the flowrate of non-condensable gases through the turbine(s).

23. A process as claimed in claim 15, further comprising sending steam from the high-pressure steam turbine(s) to at least one reheater for the high-pressure steam turbine(s), heating the steam, and returning heated team discharge from the reheater(s) to the turbine(s).

24. A process as claimed in claim 16, further comprising sending combustion gases exhausted from at least one intermediate pressure turbine to at least one reheater, heating the combustion gases, and returning heated discharge from the reheater(s) to at least one low-pressure turbine.

25. A process as claimed in claim 15, wherein said oxygen-enriched stream is supplied to the oxygen-fired combustor(s).

26. A process as claimed in claim 15, wherein said compressed nitrogen-enriched stream is heated in said main heat exchanger(s).

27. A process as claimed in claim 15, wherein the steam produced by the main heat exchanger(s) is high purity steam.

28. A system as claimed in claim 1, further comprising a means for sending the oxygen-enriched stream to said oxygen-fired combustor(s).

29. A process as claimed in claim 15, further comprising feeding the oxygen-enriched stream to said oxygen-fired combustor(s).

30. A system as claimed in claim 1, further comprising at least one feedwater heater using combustion gas as a heat source.

31. A system as claimed in claim 30, further comprising means for sending combustion gases from one or more turbine(s) to the feedwater heater(s) to provide feedwater heating.

32. A system as claimed in claim 2, further comprising at least one reheater for heating combustion gases from one or more intermediate-pressure turbine(s), means for sending interstage combustion gases from said turbine(s) to the reheater(s) and means for returning heated combustion gases from the reheater(s) to feed further turbine(s).

33. A system as claimed in claim 9, further comprising one or more reheater(s) for heating the interstage stream(s) associated with at least two steam turbines.

34. A process as claimed in claim 16, wherein one or more extractions of combustion gases from at least one turbine is employed to reduce the flowrate of non-condensable gases through the turbine(s).

35. A process as claimed in claim 16, further comprising sending combustion gases from one or more combustion gas turbine(s) to the feedwater heater(s) to provide feedwater heating.

36. A process as claimed in claim 18, wherein one or more extractions of steam from the steam turbine(s) is employed to reduce the flowrate of non-condensable gases through the turbine(s).

37. A system as claimed in claim 1, wherein the compressed nitrogen-enriched stream is heated in a separately-fired heater.

38. A system as claimed in claim 1, wherein the compressed nitrogen-enriched stream is heated in a direct-fired oxygen-fuel combustor.

39. A process as claimed in claim 15, wherein the compressed nitrogen-enriched stream is heated in a separately-fired heater.

40. A process as claimed in claim 15, wherein the compressed nitrogen-enriched stream is heated in a direct-fired oxygen-fuel combustor.

* * * * *

UNITED STATES PATENT AND TRADEMARK OFFICE
CERTIFICATE OF CORRECTION

PATENT NO. : 6,871,502 B2
DATED : March 29, 2005
INVENTOR(S) : Ovidiu Marin, Scott Macadam and Pietro Di Zanno It is certified that error appears in the above-identified patent and that said Letters Patent is hereby corrected as shown below:

Column 10,
Line 44, replace the word "team" with the word -- steam --.

Signed and Sealed this

Thirty-first Day of May, 2005

JON W. DUDAS
*Director of the United States Patent and Trademark Office*